United States Patent [19]

Mittelstadt

[11] 4,359,234

[45] Nov. 16, 1982

[54] FIFTH WHEEL ASSEMBLY FOR TRACTOR-TRAILER COMBINATION

[75] Inventor: Roy A. Mittelstadt, Sterling Heights, Mich.

[73] Assignee: General Motors Corporation, Detroit, Mich.

[21] Appl. No.: 239,558

[22] Filed: Mar. 2, 1981

[51] Int. Cl.³ .............................................. B62D 52/08
[52] U.S. Cl. ............................ 280/438 R; 280/446 R
[58] Field of Search ........... 280/438 R, 438 A, 446 R, 280/432

[56] References Cited

U.S. PATENT DOCUMENTS

| | | | |
|---|---|---|---|
| 1,995,920 | 3/1935 | Gurton et al. | 280/438 R |
| 2,056,262 | 10/1936 | Edwards | 280/438 R |
| 2,078,492 | 4/1937 | Gurton et al. | 280/438 R |
| 2,652,262 | 9/1953 | Sherry | 280/432 |
| 2,680,627 | 6/1954 | Johnson et al. | 280/438 R |

FOREIGN PATENT DOCUMENTS 615163 6/1935 Fed. Rep. of Germany .
617125 7/1935 Fed. Rep. of Germany .

OTHER PUBLICATIONS

Article: "Austin Coupling for Semi-trailers" – p. 76, *Automotive Industries*, Jul. 15, 1939.

*Primary Examiner*—Joseph F. Peters, Jr.
*Assistant Examiner*—Donn McGiehan
*Attorney, Agent, or Firm*—Edward J. Biskup

[57] ABSTRACT

A fifth wheel assembly for close-coupling a tractor-trailer combination wherein the trailer has a pair of pivot members connected thereto that are movable within a continuous 3-section track carried by the tractor, with two of the track sections being curved and connected to the straight track section and converging towards a common point so that during a turn one of the pivot members moves in the straight track section, while the other pivot member moves in either of the two curved track sections.

5 Claims, 7 Drawing Figures

FIFTH WHEEL ASSEMBLY FOR TRACTOR-TRAILER COMBINATION

The invention concerns a fifth wheel assembly for connecting a tractor to a trailer and, more particularly, a fifth wheel assembly which permits the close coupling of a tractor to a trailer and provides relative articulation therebetween.

The fifth wheel assemblies presently used for coupling a semitrailer with a tractor includes a kingpin on the trailer that is adapted to be locked to a fifth wheel member carried by the tractor. As a result, any relative angular movement between the tractor and trailer occurs about the axis of the kingpin. In order to prevent the front end of the trailer from striking the rear end of the tractor cab during a turn, a gap is provided between the two units which will range normally from 30 to 48 inches, depending upon the design of the semitrailer and the components mounted on the tractor. This large gap provides adequate clearance for the front end of of the trailer during a turning maneuver; however, it does require the operator to use a shorter trailer with less cargo-carrying space so that the trailer length stays within the existing length laws. Another drawback of this type of fifth wheel assembly is that the gap between the units creates an aerodynamic drag due to the crosswinds and thereby reduces fuel economy.

Accordingly, the objects of the present invention are: to provide a new and improved fifth wheel assembly for a tractor-trailer combination that permits the close coupling of the tractor to the trailer so that the cargo-carrying capacity of the trailer is increased relative to the overall length of the tractor-trailer combination; to provide a new and improved fifth wheel assembly for a tractor-trailer combination which permits the front of the trailer to be closely connected to the rear of the tractor so that air turbulence between the two units is minimized, with the result that fuel economy is improved; to provide a new and improved fifth wheel assembly for a tractor-trailer combination wherein one of the units supports a pair of laterally spaced pivot members which are located in a triangularly-shaped continuous guide track supported by the other of the units; to provide a new and improved fifth wheel assembly for close-coupling a tractor-trailer combination in which one of the units has a pair of pivot members connected thereto that are located in a continuous 3-section track carried by the other of the units, with two of the track sections being curved and connected to the opposite ends of the third track section which is located along a straight transverse axis so that during a turn one of the pivot members moves in the straight track section while the other pivot member moves in either of the two curved track sections; and to provide a new and improved fifth wheel assembly for an articulated vehicle that includes a pair of laterally spaced pivot members which equally share the towing effort when the vehicle is moving in a straight-ahead direction and in which one of the pivot members is adapted to move within a curved guide track while the other pivot member moves in a straight guide track when the vehicle negotiates a turn.

The above and other objects and advantages are realized in accordance with the present invention by a fifth wheel assembly which generally includes a pair of laterally spaced pivot members that are adapted to be connected to the underside of a trailer. Each of the pivot members is located within a triangularly-shaped guide track carried by the tractor, with one section of the guide track being formed with a straight track section which extends transversely to the longitudinal center axis of the tractor. The opposite ends of the straight track section are connected to a pair of curved track sections which converge towards a common point located to the rear of the straight track section. The arrangement is such that during straight-ahead movement of the tractor and trailer, both pivot members are located at the opposite ends of the straight track section; but during a turning maneuver, one of the pivot members remains in the straight track section while the other pivot member moves into one of the curved track sections. Thus, during straight-ahead movement of the tractor-trailer combination, the towing effort is equally applied to both of the pivot members; however, during a turn the pulling effort is applied to only one of the pivot members.

A more complete understanding of the present invention can be obtained from the following detailed description when taken in conjunction with the accompanying drawings, in which.

Figure 1:
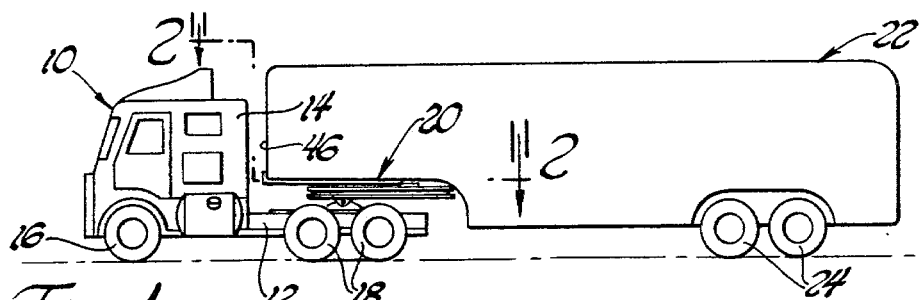
FIG. 1 shows a tractor-trailer combination in straight-ahead alignment and incorporating a fifth wheel assembly made in accordance with the present invention.

Referring to the drawings and more particularly to FIG. 1 thereof, a tractor 10 is shown having a frame 12, the front end of which supports an operator's cab 14 and a pair of transversely spaced dirigible wheels—only one of which is shown and identified by the reference numeral 16. The rear end of the frame 12 is provided with a pair of drive axles (not shown) located in tandem, with each drive axle having a wheel 18 rotatably mounted at each end thereof. The rear end of the frame 12 also carries a fifth wheel assembly 20 made in accordance with the present invention located midway between the aforementioned drive axles and serving to couple the tractor 10 to a trailer 22 so as to provide relative articulation therebetween. In addition, the rear end of the trailer 22 is provided with a pair of nondriven axles located in tandem, with each of the axles (not shown) having a wheel 24 at each end thereof fixedly aligned for straight-ahead rotation.

Figure 2:
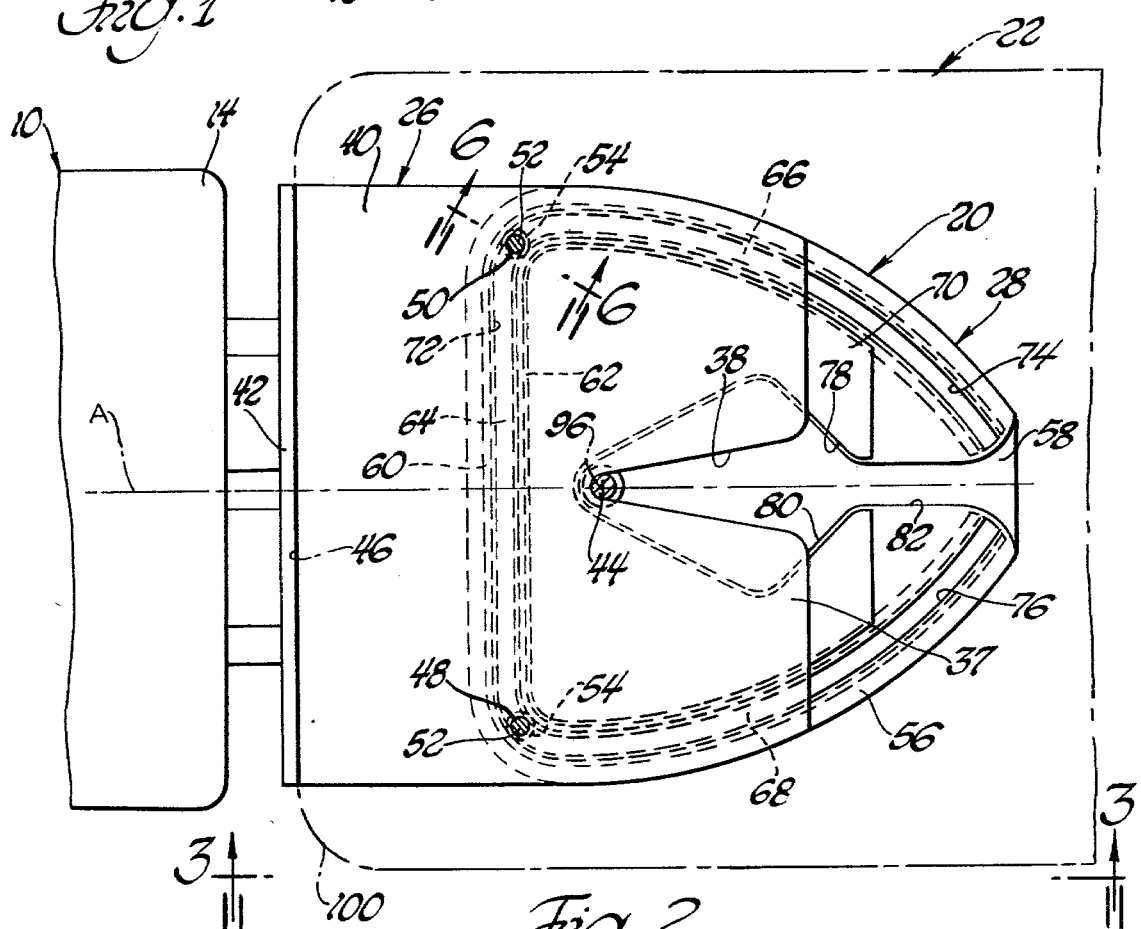
FIG. 2 is an enlarged plan view of the fifth wheel assembly taken on line 2—2 of FIG. 1.
Figure 3:
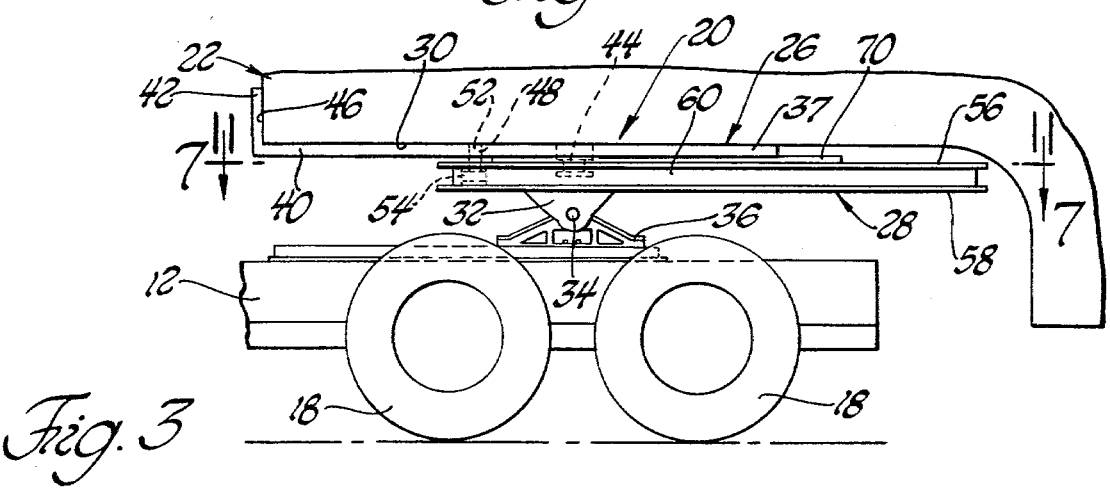
FIG. 3 is an elevational view of the fifth wheel assembly taken on line 3—3 of FIG. 2.

As seen in FIGS. 2 and 3, the fifth wheel assembly 20, in general, comprises an upper fifth wheel member 26 and a lower fifth wheel member 28. The upper fifth wheel member 26 is adapted to be fixedly connected to the front under-surface 30 of the trailer 22, while the lower fifth wheel member 28 is rigid with a bracket 32 connected by a pivot pin 34 to a support member 36 secured to the frame 12 of the tractor 10 so as to provide relative pivotal movement between the tractor 10 and the trailer 22 about a horizontal axis passing through the longitudinal center of the pivot pin 34. As will be more apparent as the description of the invention proceeds, the upper fifth wheel member 26 is supported on the lower fifth wheel member 28 for relative sliding and rotary movement so as to allow relative articulation between the tractor 10 and the trailer 22 when the tractor-trailer combination is negotiating a steering maneuver.

More specifically, the upper fifth wheel member 26 takes the form of a flat, generally rectangular plate, the rear end 37 of which is provided with a centrally located V-shaped notch 38, while the front end 40 of which is integrally formed with an upstanding straight flange 42. Although not shown, the upper fifth wheel member 26 is also provided with a conventional locking device which serves to lock the usual kingpin 44 carried by the under-surface 30 of the trailer 22 within the apex portion of the V-shaped notch 38, with the flange 42 abutting the lower front surface 46 of the trailer 22. Thus, the upper fifth wheel member 26 is securely connected to the front end of the trailer 22 so that any movement thereof results in corresponding movement of the upper fifth wheel member 26.

Figure 6:
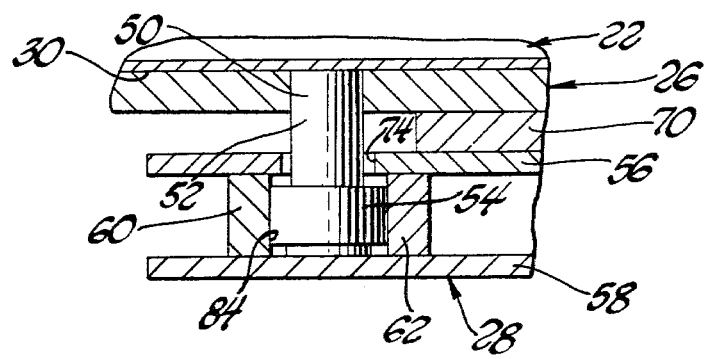
FIG. 6 is an enlarged view taken on line 6—6 of FIG. 2 showing one of the pivot members associated with the fifth wheel assembly.

The upper fifth wheel member 26 also has a pair of laterally spaced and identical pivot members 48 and 50 mounted thereon. As seen in FIG. 6, each of the pivot members 48 and 50 consists of a vertically oriented shaft or pin 52, the upper end of which is secured to the upper fifth wheel member 26, while the lower end rotatably carries a roller 54. The pivot members 48 and 50 serve to connect the upper fifth wheel member 26 to the lower fifth wheel member 28, as will now be described.

Figure 7:
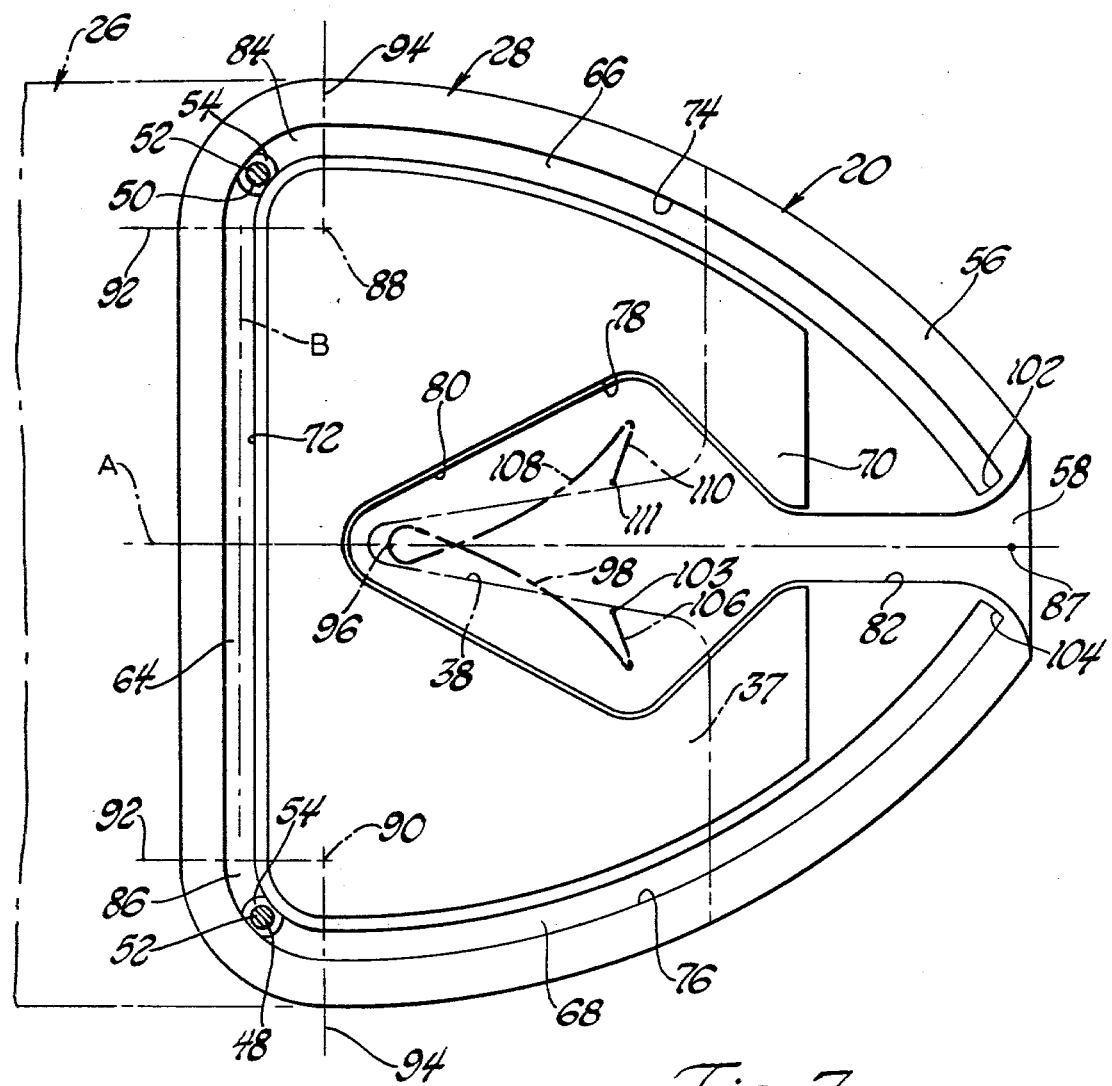
FIG. 7 is an enlarged view of the guide track formed in the lower member of the fifth wheel assembly and shows the location of the pivot members during straight-ahead movement of the tractor-trailer combination.

The lower fifth wheel member 28 comprises a top plate 56 and bottom plate 58 which are vertically spaced and parallel to each other and (as seen in FIGS. 2 and 6), are interconnected by outer and inner, triangularly-shaped wall members 60 and 62, respectively, which define a straight track section 64, a pair of curved track portions (hereinafter described), and a pair of curved track sections 66 and 68 in which the roller 54 of each pivot member 48 and 50 is adapted to travel. As best seen in FIGS. 6 and 7, the top plate 56 of the lower fifth wheel member 28 rigidly supports a wear-plate 70 upon which the upper fifth wheel member 26 rests, and is formed with slots 72, 74, and 76, which are respectively vertically aligned and register with the straight track section 64, and the curved track sections 66 and 68. The slots 72, 74, 76, are narrower in width than the distance or spacing between the respective outer and inner wall members 60 and 62 so as to accommodate the pin 52 of each of the pivot members 48 and 50 without incurring vertical separation of the respective upper and lower fifth wheel members 26 and 28. In addition, the wear-plate 70 and top plate 56 of the lower fifth wheel member 28 have respective diamond-shaped openings 78 and 80 formed therein which register with each other and serve to provide clearance for the kingpin 44 during turning maneuvers of the trailer 22, as will be hereinafter explained. The openings 78 and 80 connect with a slot 82 formed in the top plate 56 of the lower fifth wheel member 28 that provides for entrance of the kingpin 44 to the fifth wheel assembly 20 during coupling operation between the tractor 10 and trailer 22.

As seen in FIG. 2, the straight track section 64, together with curved track sections 66 and 68, provide a continuous guide track which is symmetrical about the longitudinal center axis "A" of the tractor 10. Also, as seen in FIG. 7, the straight track section 64 extends along a transverse axis "B" which is substantially perpendicular to the longitudinal center axis "A"; and the opposite ends of the straight track section 64 are connected by identical curved track portions 84 and 86, respectively, to the curved track sections 66 and 68 which extend rearwardly from the straight track section 64 and converge towards a common point 87 located on the longitudinal center axis "A". The curved track portions 84 and 86 have their centers respectively located at the points 88 and 90, and each curved track portion 84 and 86 connects with the straight track section 64 at an imaginary line 92 which is perpendicular to the transverse axis "B". Also, the curved track portions 84 and 86 connect respectively with the curved track sections 66 and 68 at an imaginary line 94 which is spaced 90 degrees from the associated imaginary line 92. It will be noted that, in the preferred form, the distance between the rotational axes of the pivot members 48 and 50 is greater than the length of the straight track section 64 so that when the tractor-trailer combination is in the straight-ahead position of FIGS. 1, 2, and 7, the rotational axis of each pivot member 48 and 50 is located substantially midway between the imaginary lines of the associated curved track portion, so that sideway sway between the tractor 10 and trailer 22 is minimized.

Figure 4:
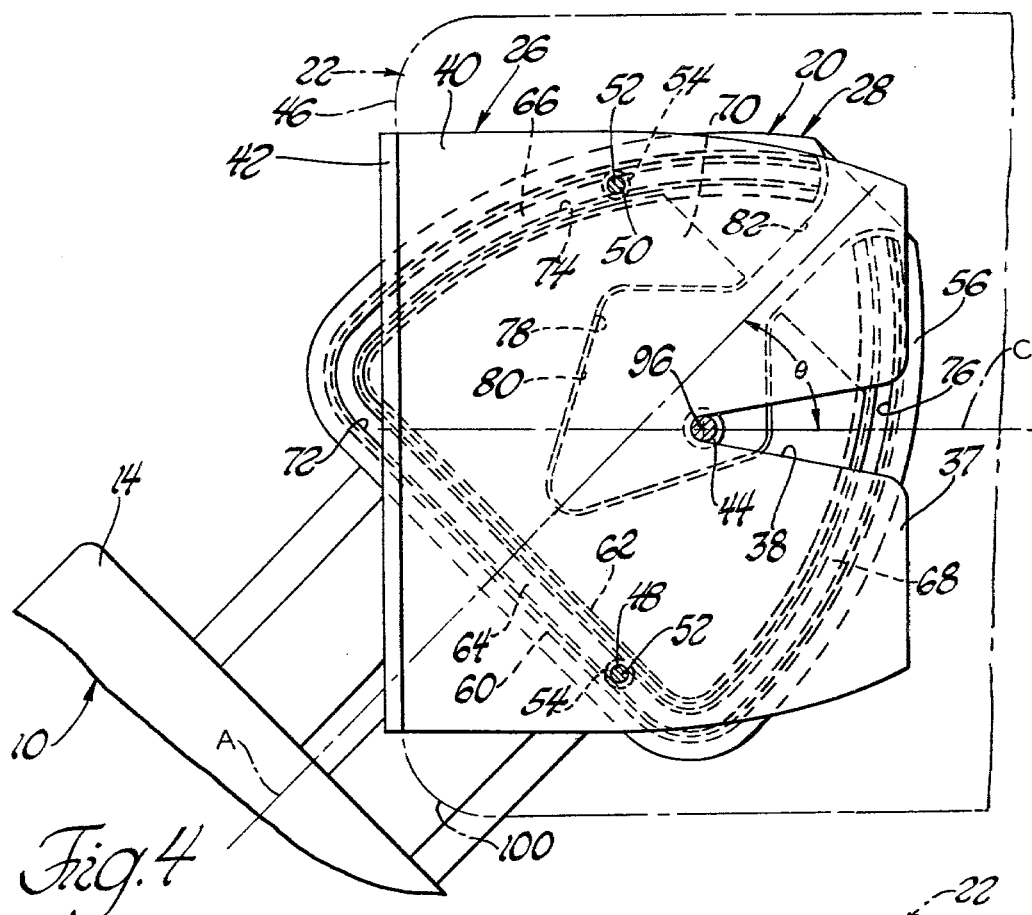
FIG. 4 is a view similar to FIG. 2 of the fifth wheel assembly, but shows a tractor turned approximately 45 degrees relative to the trailer.
Figure 5:
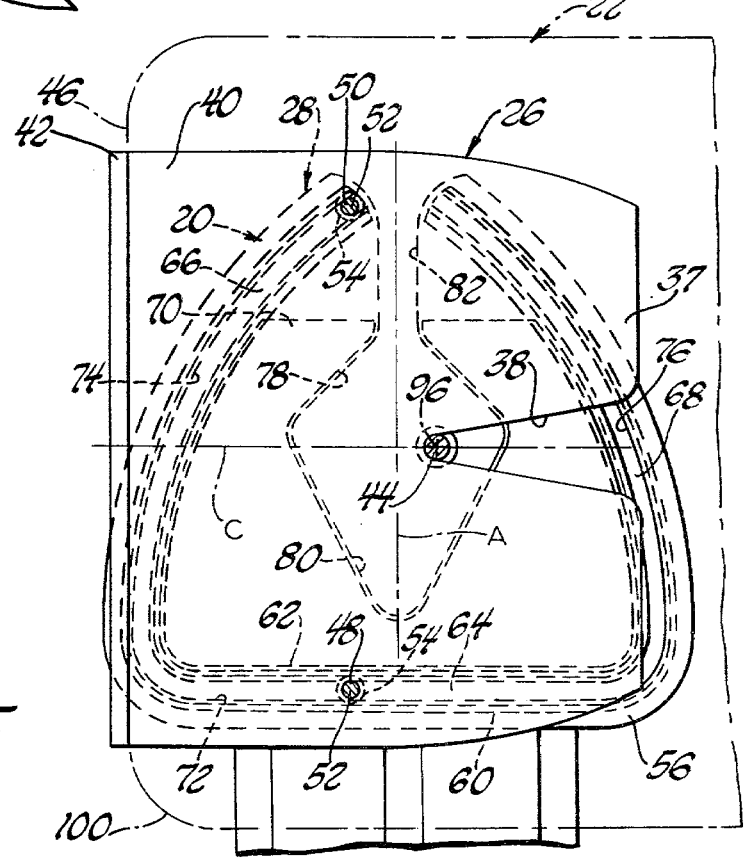
FIG. 5 is also a view similar to FIG. 2 of the fifth wheel assembly, but shows the tractor turned approximately 90 degrees relative to the trailer.

The fifth wheel assembly 20 described above allows the tractor 10 and trailer 22 to be closely coupled and allows turning maneuvers without incurring interference between the front end of the trailer 22 and the rear portion of the operator's cab 14. In this regard, when the tractor-trailer combination is moving in a straight-ahead direction (as seen in FIGS. 1 through 3), the pivot members 48 and 50 are located in the curved track portions 84 and 86, and the pulling effort is divided equally between the two pivot members 48 and 50. When the tractor is turned to the right or left of the straight-ahead position, one of the pivot members 48 or 50 moves into the straight track section 64 and provides a pivot axis about which the tractor 10 rotates, while the other pivot members moves into one of the curved track sections 66 or 68. In this regard—and as seen in FIGS. 1 and 4, when the tractor 10 is turned from the straight-ahead position shown in FIG. 1—towards the left or counterclockwise relative to the position of trailer 22 as seen in FIG. 4—the pivot member 48 moves into the straight track section 64 towards the longitudinal center axis "A", while the other pivot member 50 moves into the curved track section 66. At the same time and as seen in FIG. 7, the center 96 of the kingpin 44 follows the path 98 shown located within the respective openings 78 and 80 of the top plate 56 and the wear-plate 70. Center 96 of the kingpin moves initially away from and then crosses the longitudinal center axis "A" of the tractor 10; then follows the curved path 98 shown until the center 96 assumes the position shown in FIG. 4. During this time, the trailer 22 rotates essentially about the pivot member 48 while the kingpin 44 moves rearwardly so as to allow the corner 100 of the trailer 22 to clear the rear of the operator's cab 14. When the tractor 10 reaches the position shown in FIG. 4, the longitudinal center axis "A" of the tractor 10 forms an angle $\theta$ of approximately 45 degrees with the longitudinal center axis "C" of the trailer 22. As the tractor 10 continues to turn to the left or in a counterclockwise direction from the position seen in FIG. 4, the pivot member 48 moves in the straight track section 64 towards the longitudinal center axis "A", while the pivot member 50 moves in the curved track section 66 towards the point 87 until it reaches the end 102 of the curved track section 66 and the pivot member 48 crosses the longitudinal center axis "A" and assumes the position shown in FIG. 5. As the tractor 10 moves from the position of FIG. 4 to that shown in FIG. 5, the center 96 of the kingpin 44 continues to move away from the axis "A" along the path 98 seen in FIG. 7 and then reverses its direction and moves along the path 106 towards the axis "A" until it reaches point 103 thereon, as shown, at which point the longitudinal center axis "A" of the tractor 10 is substantially perpendicular to the longitudinal center axis "C" of the trailer 22 and the kingpin 44 is located close to the axis "A".

It will be understood that when the tractor 10 is turned to the right of the straight-ahead position or clockwise as seen in FIG. 2, the pivot member 50 will move from the curved track portion 84 into the straight track section 64 while the pivot member 48 will move from the curved track portion 86 into the curved track section 68. Inasmuch as the guide track is symmetrical about the axis "A", the pivot members 50 and 48 will move in the straight track section 64 and the curved track portion 86, respectively, and assume the opposite positions that they assumed when the tractor 10 was turned to the left as described above. Also, as the tractor 10 turns clockwise from the FIG. 2 position to a position whereat the longitudinal axis "A" is substantially perpendicular to the longitudinal center axis "C", the center 96 of the kingpin 44 will initially travel along the path 108 and then reverse direction and move along the path 110 until it reaches the point 111 thereon to again have the kingpin 44 located close to the longitudinal axis "A".

As seen in FIG. 2, the kingpin 44 is located vertically above and directly in line with the pivot pin 34 when the tractor 10 and trailer 22 are in the straight-ahead position. It will be noted that the kingpin 44 represents the load-center of the front end of the trailer 22 on the lower fifth wheel member 28 and that the guide track-defined by the straight track section 64, the curved track sections 66 and 68, and the curved track portions 84 and 86—is designed so that close-coupling of the tractor 10 and trailer 22 is achieved and the load-center remains as close as possible to the longitudinal center axis "A" of the tractor 10 as the tractor is turned to the left or right as aforedescribed. It will also be noted that although the triangular guide track having the curved track sections described above was found to operate satisfactorily, the guide track can be otherwise configured so long as the track is generally of U-shape with the track open-end facing the rear of the tractor 10. For example, the track sections 66 and 68 could be substantially straight; however, it has been observed that the curvature of the track sections 66 and 68 will affect the aforementioned load-center location relative to the the longitudinal center axis "A" of the tractor 10 when the tractor 10 is turning relative to the trailer 22.

Various modifications and changes can be made in this construction without departing from the spirit of the invention. Such changes and modifications are anticipated by the inventor, and he does not wish to be limited except by the scope of the appended claims.

The embodiments of the invention for which an exclusive property or privilege is claimed are defined as follows:

1. A fifth wheel device for coupling a tractor unit to a trailer unit and for providing relative articulation therebetween, one of said units having a pair of pivot members connected thereto; the other of said units having a guide track comprising a first track section, a second track section, and a third track section, said first track section being located along an axis which extends transversely to the longitudinal center axis of said other of said units, with one end portion of said first track section connected to said second track section and the other end portion of said first track section connected to said third track section so as to form a continuous guide track for said pair of pivot members; said second track section and said third track section extending rearwardly from said first track section and the spacing between said pair of pivot members being such that during straight-ahead alignment of said tractor unit and said trailer unit, one of said pair of pivot members is located adjacent said one end portion of said first track section and the other of said pivot members is located adjacent said other end portion of said first track section, but during a turning maneuver in one direction one of said pair of pivot members moves along said first track section while the other of said pair of pivot members moves along said second track section, and during a turning maneuver in a direction opposite to said one direction, said other of said pair of pivot members moves along said first track section while said one of said pair of pivot members moves along said third track section.

2. A fifth wheel device for coupling a tractor unit to a trailer unit and for providing relative articulation therebetween, one of said units having a pair of pivot members connected thereto, each of said pair of pivot members being spaced laterally equidistantly from the longitudinal center axis of said one of said units, with one of said pair of pivot members being located on one side of said longitudinal center axis and the other of said pair of pivot members being located on the opposite side of said longitudinal center axis; the other of said units having a guide track comprising a first track section, a second track section, and a third track section, said first track section being located along an axis which extends substantially perpendicular to said longitudinal center axis of said other of said units, with one end portion of said first track section connected to said second track section and the other end portion of said first track section connected to said third track section so as to form a continuous guide track for said pair of pivot members; said second track section and said third track section extending rearwardly from said first track section and the spacing between said pair of pivot members being such that during straight-ahead alignment of said tractor unit and said trailer unit, one of said pair of pivot members is located adjacent said one end portion of said first track section and the other of said pair of pivot members is located adjacent said other end portion of said first track section, but during a turning maneuver in one direction one of said pair of pivot members moves along said first track section while the other of said pair of pivot members moves along said second track section, and during a turning maneuver in a direction opposite to said one direction, said other of said pair of pivot members moves along said first track section while said one of said pair of pivot members moves along said third track section.

3. A fifth wheel device for coupling a tractor unit to a trailer unit and for providing relative articulation therebetween, one of said units having a pair of pivot members connected thereto; the other of said units having a guide track comprising a straight track section and a pair of curved track sections, said straight track section being located along an axis which extends transversely to the longitudinal center axis of said other of said units, with one end portion of said straight track section connected to one of said pair of curved track sections and the other end portion of said straight track section connected to the other of said pair of curved track sections so as to form a continuous guide track for said pair of pivot members; said pair of curved track sections extending rearwardly from said straight track section and the spacing between said pair of pivot members being such that during straight-ahead alignment of said tractor unit and said trailer unit, one of said pair of pivot members is located adjacent said one end portion of said straight track section and the other of said pair of pivot members is located adjacent said other end portion of said straight track section, but during a turning maneuver in one direction, one of said pair of pivot members moves along said straight track section while the other of said pair of pivot members moves along one of said pair of curved track sections, and during a turning maneuver in a direction opposite to said one direction, said other of said pair of pivot members moves along said straight track section while said one of said pair of pivot members moves along said other of said pair of curved track sections.

4. A fifth wheel device for coupling a tractor unit to a trailer unit and for providing relative articulation therebetween, one of said units having a pair of pivot members connected thereto, each of said pair of pivot members being spaced laterally equidistantly from the longitudinal center axis of said one of said units, with one of said pair of pivot members being located on one side of said longitudinal center axis and the other of said pair of pivot members being located on the opposite side of said longitudinal center axis; the other of said units having a guide track comprising a straight track section and a pair of curved track sections, said straight track section being located along an axis which extends substantially perpendicular to said longitudinal center axis of said other of said units, with one end portion of said straight track section connected to one of said pair of curved track sections and the other end portions of said straight track section connected to the other of said pair of curved track sections so as to form a continuous guide track for said pair of pivot members; said pair of curved track sections extending rearwardly from said straight track section and converging towards a common point located on said longitudinal center axis of said other of said units; the spacing between said pair of pivot members being such that during straight-ahead alignment of said tractor unit and said trailer unit, one of said pair of pivot members is located adjacent said one end portion of said straight track section and the other of said pair of pivot members is located adjacent said other end portion of said straight track section, but during a turning maneuver in one direction, one of said pair of pivot members moves along said straight track section while the other of said pair of pivot members moves along one of said pair of curved track sections, and during a turning maneuver in a direction opposite to said one direction, said other of said pair of pivot members moves along said straight track section while said one of said pair of pivot members moves along said other of said pair of curved track sections.

5. A fifth wheel device for coupling a tractor unit to a trailer unit and for providing relative articulation therebetween, one of said units having a pair of pivot members connected thereto, each of said pair of pivot members being spaced laterally equidistantly from the longitudinal center axis of said one of said units, with one of said pair of pivot members being located on one side of said longitudinal center axis and the other of said pair of pivot members being located on the opposite side of said longitudinal center axis; the other of said units having a guide track comprising a straight track section, a pair of curved track sections, and a pair of curved track portions, said straight track section being located along an axis which extends transversely to said longitudinal center axis of said other of said units, with one of said pair of curved portions connecting one end of said straight track section to one of said pair of curved track sections and the other of said pair of curved track portions connecting the other end of said straight track section to the other of said pair of curved track sections so as to form a continuous guide track for said pair of pivot members that is symmetrical about said longitudinal center axis of said other of said units, said pair of curved track sections extending rearwardly from said straight track section and converging towards a common point located on said longitudinal center axis of said other of said units; the spacing between said pair of pivot members being such that during straight-ahead alignment of said tractor unit and said trailer unit, one of said pair of pivot members is located in said one of said pair of curved track portions and the other of said pair of pivot members is located in said other of said pair of curved track portions, but during a turning maneuver in one direction, one of said pair of pivot members moves along said straight track section while said other of said pair of pivot members moves along one of said pair of curved track sections, and during a turning maneuver in a direction opposite to said one direction, said other of said pair of pivot members moves along said straight track section while said one of said pair of pivot members moves along said other of said pair of curved track sections.

* * * * *